(12) United States Patent
Pandey et al.

(10) Patent No.: US 9,733,998 B2
(45) Date of Patent: Aug. 15, 2017

(54) METHOD AND SYSTEM FOR MANAGING AND LINKING SOFTWARE APPLICATIONS

(71) Applicant: SVG Media Pvt Ltd, New Delhi (IN)

(72) Inventors: Vaibhav Pandey, Gurgaon (IN);
Siddharth Puri, Gurgaon (IN)

(73) Assignee: SVG Media Pvt Ltd (IN)

( * ) Notice: Subject to any disclaimer, the term of this patent is extended or adjusted under 35 U.S.C. 154(b) by 0 days.

(21) Appl. No.: 15/063,357

(22) Filed: Mar. 7, 2016

(65) Prior Publication Data
US 2017/0091001 A1 Mar. 30, 2017

(30) Foreign Application Priority Data
Sep. 24, 2015 (IN) .......................... 3049/DEL/2015

(51) Int. Cl.
*G06F 13/00* (2006.01)
*G06F 9/54* (2006.01)

(52) U.S. Cl.
CPC .............. *G06F 9/543* (2013.01); *G06F 9/545* (2013.01)

(58) Field of Classification Search
CPC ....................................................... G06F 9/541
USPC ......................................................... 719/328
See application file for complete search history.

(56) References Cited

U.S. PATENT DOCUMENTS

| | | | |
|---|---|---|---|
| 7,167,842 B1* | 1/2007 | Josephson, II | G06Q 20/382 |
| | | | 705/44 |
| 9,152,786 B2* | 10/2015 | Zeng | G06F 21/52 |
| 9,230,022 B1* | 1/2016 | Banerjee | G06F 17/30864 |
| 9,292,467 B2* | 3/2016 | Connolly | G06F 15/16 |
| 2014/0075574 A1* | 3/2014 | Zheng | G06F 21/31 |
| | | | 726/28 |

\* cited by examiner

*Primary Examiner* — Andy Ho
(74) *Attorney, Agent, or Firm* — Kolisch Hartwell, P.C.

(57) ABSTRACT

A computer-implemented method associates a plurality of applications, and includes the step of receiving an application programming interface associated with each of the applications. The computer-implemented method also unifies the received application programming interface associated with each of the applications, and classifies the application programming interface associated with each of the applications into a corresponding category. The computer-implemented method also associates the application programming interface associated with each of the applications based on the classification and a pre-determined set of rules to be followed by a processor. The association is done by cross linking the application programming interface associated with each of the applications.

16 Claims, 7 Drawing Sheets

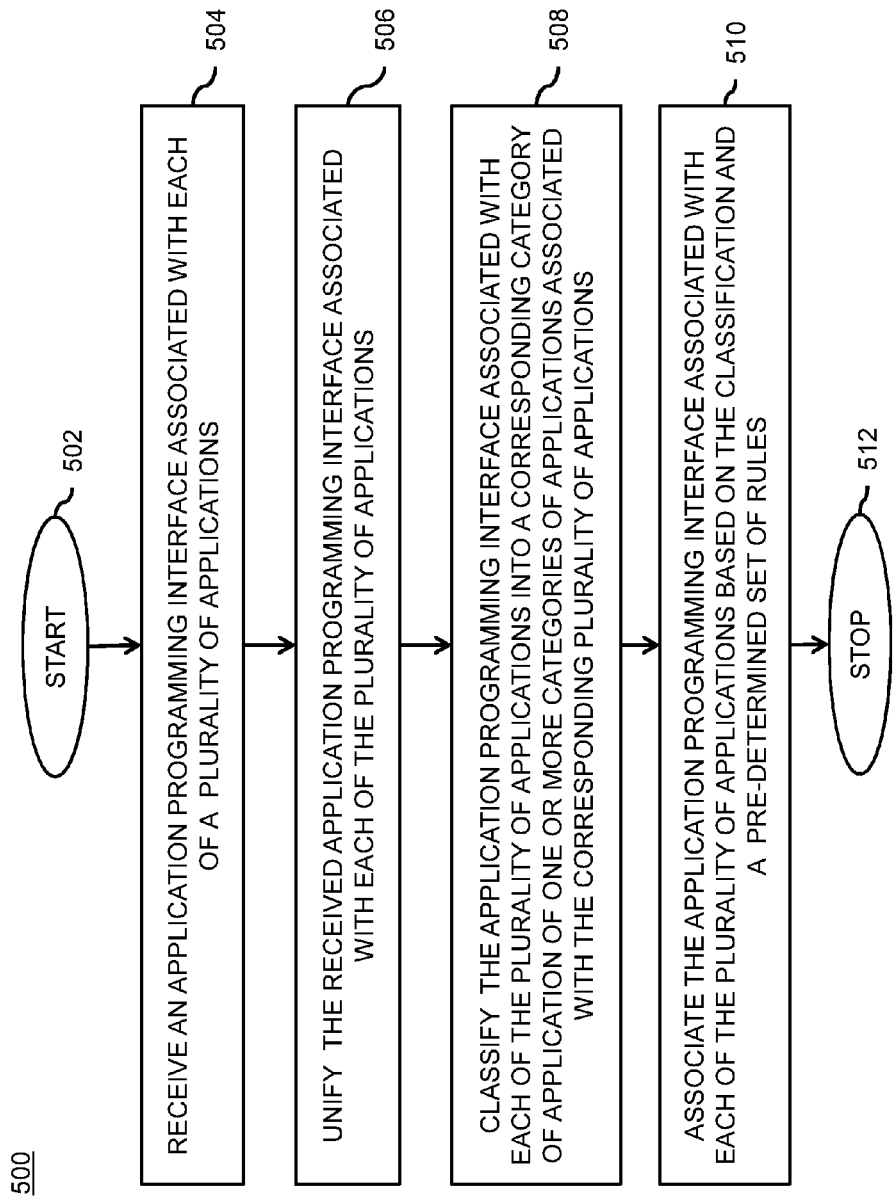

METHOD AND SYSTEM FOR MANAGING AND LINKING SOFTWARE APPLICATIONS

The present invention relates to the field of mobile applications. More specifically, the present disclosure relates to a method and system for managing and associating a plurality of applications.

With the advancements in technology over the last decade, a large quantity of users has resorted towards using a variety of communication devices. These communication devices include smart phone, tablets, laptop and the like. Also, these communication devices enable the users to access a number of mobile applications. The users fulfill their day to day needs by availing services provided by these applications. In addition, these applications are provided by various companies for promoting their products and services to the users. These companies run their business by generating revenue through these interactive applications.

Going further, these companies offer a range of on demand service applications to the users. These on demand service applications accomplish the demands of the users by charging a pre-defined amount of money in real time. Moreover, each application belongs to a specific class or category of service provided by the application provider. These applications include taxi based service applications, food service based applications, housing services based applications and the like.

In general, the mobile applications are developed through an application programming interface. The application programming interface sets the groundwork for these mobile applications. In general, the application programming interface is a set of routines, protocols and tools which are used by various application developers to develop the mobile applications. Nowadays, many application developers or providers have started providing their application programming interfaces to other developers to some extent. The application developers allow other developers to utilize their application programming interface for running their business. For example, an application developer may utilize Google Maps API on their application for providing real time directions for users. Moreover, these are open source APIs which can be used by various application developers for building their application.

Presently, many companies have not allowed their application programming interfaces to be utilized by other developers. However, a number of companies have started dealing exclusively with other companies by enabling them to utilize or link their application programming interface in their applications. The companies have started linking their application programming interfaces with the applications programming interfaces of other companies. Moreover, a single application developer may provide its application programming interface to more than one company based on their choice. In addition, the company needs to physically approach all the companies with whom it wants to deal with. Further, the sharing of application programming interfaces is done for maximizing revenue. The companies dealing in sharing of their application programming interfaces share the profit as well based on a mutual contract between them.

The existing systems and methods for linking various application programming interfaces with each other are inefficient. There is no such platform present in the art which reduces the need for the application providers to physically approach other application providers in order to deal with them. Moreover, this particular dealing method leads to wastage of time of the application providers. In addition, the present systems and methods do not allow categorization of each application programming interface into a corresponding category of service associated with each of the application programming interface. Further, the present systems and methods do not allow cross linking of the application programming interfaces belonging to a category with various other application programming interfaces belonging to various other categories of applications at the same time. Moreover, the present systems and methods for dealing does not allow the application providers to link with more than one other application programming interfaces at the same time and does not allow the application provider to maximize the revenue by providing users with different options for utilizing one or more services on a single application.

SUMMARY

In one aspect, the present disclosure provides a computer implement method that associates a plurality of applications. The computer-implemented method receives an application programming interface associated with each of the plurality of applications with a processor. The computer-implemented method also unifies the received application programming interface associated with each of the applications, and classifies the application programming interface associated with each of the applications into a corresponding category. The computer-implemented method also associates the application programming interface associated with each of the applications based on the classification and a pre-determined set of rules to be followed by a processor. The association is done by cross linking the application programming interface associated with each of the applications.

In an embodiment of the present disclosure, the computer-implemented method determines the corresponding category of application for the application programming interface associated with each of the plurality of applications. In addition, each of the plurality of applications is an on demand service application.

In another embodiment, one or more application programming interfaces associated with a first category of application are cross linked with one or more application programming interfaces associated with a second category of applications. The first category of application is distinct from the second category class of application.

In another embodiment, the one or more application programming interfaces associated with the first category of application are cross linked with one or more application programming interfaces associated with a plurality of categories of applications. The first category of application is distinct from each of the plurality of categories of applications. Also, each category of application of the plurality of categories of application is a distinct category of application.

In another embodiment, the pre-determined set of rules is defined based on a current location of a user accessing one or more applications of the plurality of applications. In addition, the pre-determined set of rules is defined based on a current time of accessing the one or more applications of the plurality of applications. Moreover, the pre-determined set of rules is defined based on a gender of the user accessing the one or more applications of the plurality of applications. Further, the pre-determined set of rules is defined based on an age of the user accessing the one or more applications of the plurality of applications.

In another embodiment, the pre-determined set of rules is set by an administrator.

In another embodiment, the pre-determined set of rules is set by an application provider associated with each of the plurality of applications.

In another embodiment, the application programming interface associated with each of the plurality of applications is received from a corresponding application server of a plurality of application servers. The plurality of application servers is associated with the corresponding plurality of applications.

In another embodiment, the computer-implemented method further generates a common application programming interface for each of one or more application programming interfaces with the processor. The one or more application programming interfaces are classified into a corresponding similar category of application.

In an embodiment, the computer-implemented method further stores the application programming interface associated with each of the plurality of applications and each of the classified application programming interfaces. In addition, the computer-implemented method stores each of the unified application programming interfaces and each of the associated application programming interfaces and the pre-determined set of rules.

In another aspect, the present disclosure provides a computer-program product. The computer-program product associates a plurality of applications. The computer-program product includes a computer readable storage medium. The computer readable storage medium has a computer program stored thereon. The computer-program product receives an application programming interface associated with each of the plurality of applications. In addition, the computer-program product unifies the received application programming interface associated with each of the plurality of applications. Moreover, the computer-program product classifies the application programming interface associated with each of the plurality of applications into a corresponding category of application of one or more categories of applications. The one or more categories of applications are associated with the corresponding plurality of applications. Further, the computer-program product associates the application programming interface associated with each of the plurality of applications based on the classification and a pre-determined set of rules. Furthermore, the association is done by cross linking the application programming interface associated with each of the plurality of applications.

In another embodiment, the computer-program product determines the corresponding category of application for the application programming interface associated with each of the plurality of applications. In addition, each of the plurality of applications is an on demand service application.

In another embodiment, one or more application programming interfaces associated with a first category of application are cross linked with one or more application programming interfaces associated with a second category of applications. The first category of application is distinct from the second category class of application.

In another embodiment, the one or more application programming interfaces associated with the first category of application are cross linked with one or more application programming interfaces associated with a plurality of categories of applications. The first category of application is distinct from each of the plurality of categories of applications. Also, each category of application of the plurality of categories of application is a distinct category of application.

In yet another aspect, the present disclosure provides a system. The system associates a plurality of applications. The system includes a receiving module in a processor. The receiving module receives an application programming interface associated with each of the plurality of applications. In addition, the system includes a unification module in the processor. The unification module unifies the received application programming interface associated with each of the plurality of applications. Moreover, the system includes a classification engine in the processor. The classification engine classifies the application programming interface associated with each of the plurality of applications into a corresponding category of application of one or more categories of applications. The one or more categories of applications are associated with the corresponding plurality of applications. Further, the system includes an association engine in the processor. The association engine associates the application programming interface associated with each of the plurality of applications based on the classification and a pre-determined set of rules. Furthermore, the association is done by cross linking the application programming interface associated with each of the plurality of applications.

In another embodiment, the classification engine further includes a determination module in the processor. The determination module determines the corresponding category of application for the application programming interface associated with each of the plurality of applications. In addition, each of the plurality of applications is an on demand service application.

In another embodiment, one or more application programming interfaces associated with a first category of application are cross linked with one or more application programming interfaces associated with a second category of applications. The first category of application is distinct from the second category class of application.

In another embodiment, the one or more application programming interfaces associated with the first category of application are cross linked with one or more application programming interfaces associated with a plurality of categories of applications. The first category of application is distinct from each of the plurality of categories of applications. Also, each category of application of the plurality of categories of application is a distinct category of application.

In another embodiment, the system further includes a generating module in the processor. The generating module generates a common application programming interface for each of one or more application programming interfaces with the processor. The one or more application programming interfaces are classified into a corresponding similar category of application.

In another embodiment, the system further includes a database in the processor. The database stores the application programming interface associated with each of the plurality of applications and each of the classified application programming interfaces. In addition, the database stores each of the unified application programming interfaces and each of the associated application programming interfaces and the pre-determined set of rules.

BRIEF DESCRIPTION OF THE DRAWINGS

Having described the invention in general terms, reference is now be made to the accompanying drawings, which are not necessarily drawn to scale, and wherein:

FIG. 5 illustrates a flowchart for the association of the plurality of applications, in accordance with various embodiments of the present disclosure.

It should be noted that the accompanying figures are intended to present illustrations of exemplary embodiments of the present disclosure. These figures are not intended to limit the scope of the present invention.

DETAILED DESCRIPTION

In the following description, numerous specific details are set forth to provide a thorough understanding of the present invention. It will be apparent, however, to one skilled in the art that the present invention can be practiced broadly without these specific details. In some instances, structures and devices are shown in block diagram form to provide clarity and to avoid obscuring aspects the present invention.

Reference below to "one embodiment" or "an embodiment" means that a particular feature, structure, or characteristic is included in at least one embodiment of the present invention. The appearance of the phrase "in one embodiment" below does not necessarily refer to the same embodiment, nor are separate or alternative embodiments mutually exclusive. The intent is that a feature of one embodiment may be present alone or in combination with features of other embodiments. Similarly, various described requirements may be applicable to some embodiments but not all embodiments.

Moreover, although the following description contains details for the purpose of describing the invention to meet the pertinent requirements of the U.S. Patent Statute, those skilled in the art will appreciate that many variations of the invention are possible, and are within the scope of this description and the invention. Similarly, although many of the features of the present invention are described in terms of each other, or in conjunction with each other, those skilled in the art will appreciate that many of these features can be used independently. Accordingly, this description meets the requirement of the U.S. Patent Statute, but, where appropriate, is intended to be exemplary, allowing for variations to, and without imposing limitations upon, the present invention.

Figure 1:
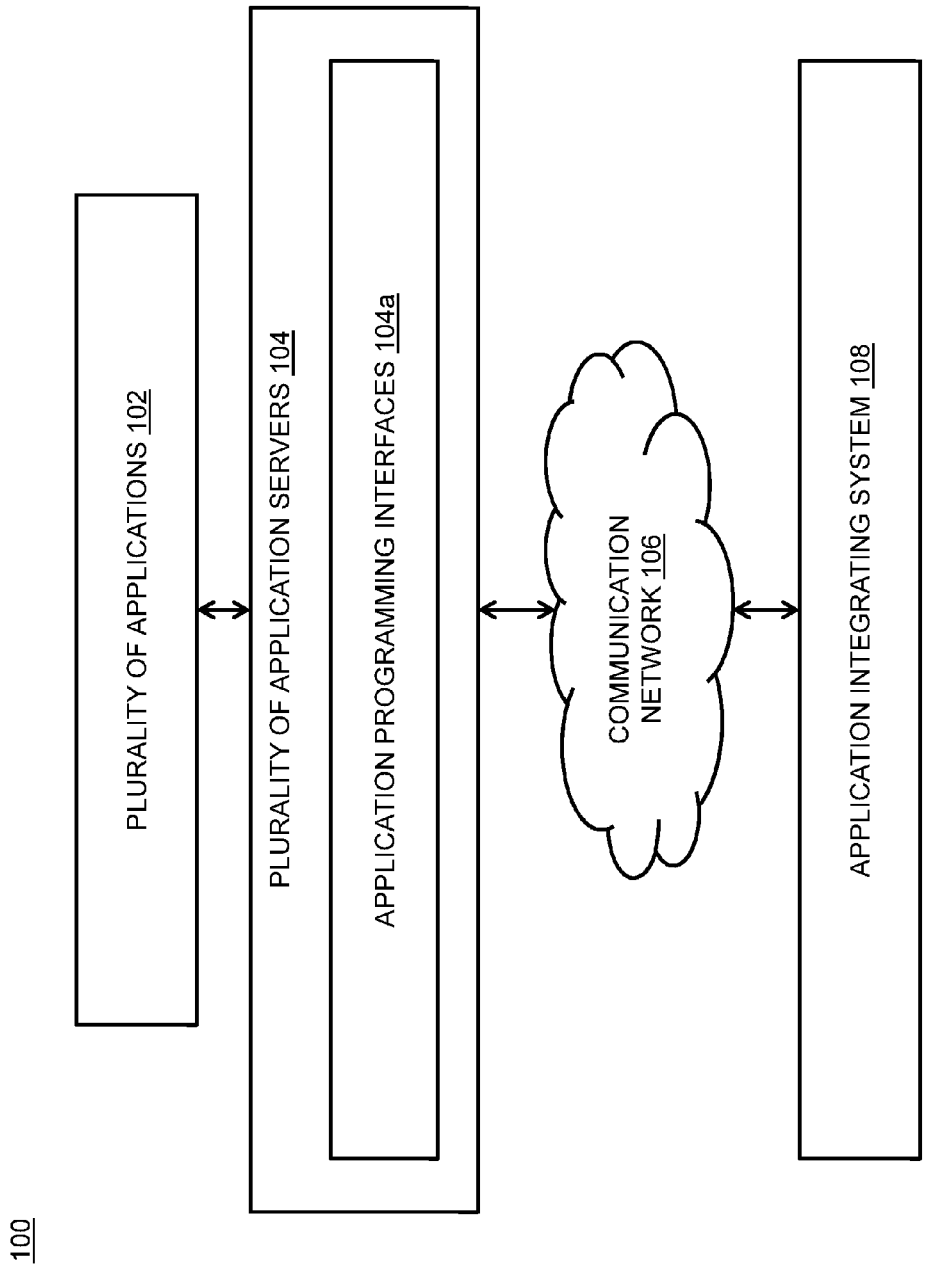
FIG. 1 illustrates a general overview of a system for associating a plurality of applications, in accordance with various embodiments of the present disclosure.

FIG. 1 illustrates a general overview of a system 100 for associating a plurality of applications, in accordance with various embodiments of the present disclosure. The plurality of applications is associated with a corresponding category of application of one or more categories of applications. The system 100 includes a plurality of applications 102, a plurality of application servers 104, a communication network 106 and an application integrating system 108. In addition, the application integrating system 108 performs the association of the plurality of applications associated with the corresponding category of the one or more categories.

Going further, the plurality of applications 102 correspond to a plurality of mobile applications configured to run on a plurality of portable communication devices. Examples of the plurality of portable communication devices include a smart phone, a tablet, a laptop, a smart watch and the like. Moreover, each of the plurality of applications is associated with a corresponding operating system of a plurality of operating systems. The plurality of operating systems include but may not be limited to an Android operating system, iOS, Windows operating system, Bada operating system, Symbian operating system and the like.

Each of the plurality of portable communication devices is connected to the internet in real time. In an embodiment of the present disclosure, each of the plurality of portable communication devices is associated with a corresponding plurality of users who access one or more applications of the plurality of applications. In an embodiment of the present disclosure, the plurality of applications 102 is installed on the corresponding plurality of portable communication devices. In another embodiment of the present disclosure, a number of applications of the plurality of applications 102 are installed in a particular portable communication device of the plurality of portable communication devices. The number of applications is installed based on a choice of a user of the plurality of users.

In addition, each of the plurality of applications 102 is an on demand service application. Further, the on demand service applications include one or more taxi service applications, one or more food based service applications and one or more travel planning based applications. Moreover, each of the plurality of applications 102 include one or more home service applications and other one or more applications known in the art employed in providing one or more services to the plurality of users. In an embodiment of the present disclosure, each of the plurality of users access one or more applications of the plurality of applications 102 for utilizing one or more services based on their choice.

Going further, each of the plurality of applications 102 is associated with an application server of the corresponding plurality of application servers 104. In an embodiment of the present disclosure, an application of the plurality of applications 102 is stored in the corresponding application server of the plurality of application servers 104. In an embodiment of the present disclosure, each application server of the plurality of application servers 104 is configured to run the corresponding application of the plurality of applications 102. Also, each application server of the plurality of application servers 104 handles all application operations between the plurality of users and an organization's backend business applications. In an embodiment of the present disclosure, each of the plurality of application servers 104 is remotely located from each other.

In an embodiment of the present disclosure, each of the plurality of application servers 104 is operated or controlled by a corresponding application provider associated with each of the plurality of applications 102. In an embodiment of the present disclosure, each of the plurality of application server 104 is controlled or monitored by a corresponding application administrator at a remote location. Moreover, the plurality of application servers 104 is associated with application programming interfaces 104a. In an embodiment of the present disclosure, each application programming interface of the application programming interfaces 104a is associated with the corresponding application of the plurality of applications 102. Each application programming interface of the application programming interfaces 104a is stored in the corresponding application server of the plurality of application servers 104.

Further, each of the plurality of applications 102 are based on a specific application programming interface designed for a specific type or category of application. The application programming interface is a set of commands, functions and protocols used by a plurality of application providers. The plurality of application providers utilize the application programming interface for using one or more pre-defined functions for building one or more applications for a specific type of operating system. In an embodiment of the present disclosure, each of the application programming interfaces 104a is an open application programming interface based on a pre-determined criterion (mentioned below in the patent application).

In an embodiment of the present disclosure, the plurality of application providers enable the corresponding application programming interfaces 104a to be utilized by other application developers. In an embodiment of the present disclosure, the plurality of application providers may allow an exclusive access of their application programming interfaces to other one or more application providers or developers. In addition, the exclusive access is provided based on exclusive dealing between the one or more application providers and the other one or more application providers (as described below in the detailed description of FIG. 2A).

In an embodiment of the present disclosure, each of the application programming interfaces is associated with a specific key. In an embodiment of the present disclosure, each of the plurality of application providers provides the specific key to other developers for gaining access to the application programming interfaces. In an embodiment of the present disclosure, the specific key is an application programming interface key which is a code passed for identifying a calling program and the corresponding application developer. In an embodiment of the present disclosure, the application programming interface key is used for tracking and controlling how the application programming interface is used.

In an embodiment of the present disclosure, each of the application programming interfaces 104a is identified using the application programming interface key. In an embodiment of the present disclosure, the application programming interface key for each of the application programming interfaces 104a is stored in the corresponding application server of the plurality of application servers 104. In an embodiment of the present disclosure, the application programming key is fetched from the application server of the corresponding plurality of application servers 104. In an embodiment of the present disclosure, the application programming key is fetched for gaining access to the application programming interface of the application programming interfaces 104a.

Going further, each of the plurality of application servers 104 is associated with the communication network 106. In an embodiment of the present disclosure, each application of the plurality of applications 102 is associated with the corresponding application server of the plurality of application servers 104 through the communication network 106. Moreover, the communication network 106 enables a medium for transfer of information between each of the plurality of applications 102 and each of the plurality of application servers 104. In an embodiment of the present disclosure, the communication network 106 enables working of the each of the plurality of applications 102.

Further, the medium for communication may be infrared, microwave, radio frequency (RF) and the like. The communication network 106 includes but may not be limited to a local area network, a metropolitan area network, a wide area network and a virtual private network. The communication network 106 includes a global area network, a home area network or any other communication network presently known in the art. The communication network 106 is a structure of various nodes or communication devices connected to each other through a network topology method. Examples of the network topology include a bus topology, a star topology, a mesh topology and the like.

In an embodiment of the present disclosure, each of the plurality of applications 102 is accessed by the plurality of users through the communication network 106. In an embodiment of the present disclosure, each of the plurality of applications 102 is connected to the internet through the communication network 106. In an embodiment of the present disclosure, each of the plurality of portable communication devices is connected to the internet through the communication network 106.

Moreover, each of the plurality of applications 102 is associated with the application integrating system 108. In an embodiment of the present disclosure, each of the plurality of applications 102 is associated with the application integrating system 108 through the communication network 106. In addition, each of the plurality of application servers 104 is associated with the application integrating system 108. In an embodiment of the present disclosure, each of the plurality of application servers 104 is associated with the application integrating system 108 through the communication network 106.

Going further, in an embodiment of the present disclosure, the application integrating system 108 is linked with each of the plurality of application servers 104. In an embodiment of the present disclosure, each of the plurality of application providers enable or allow the application integrating system 108 to fetch one or more information each of the plurality of application servers 104 (mentioned below in the patent application). Moreover, the application integrating system 108 performs the association of the plurality of applications associated with the corresponding category of the one or more categories of applications.

In addition, the application integrating system 108 includes a central server for performing one or more operations. The one or more operations perform the association of the plurality of applications associated with the corresponding category of the one or more categories of applications. Further, the application integrating system 108 is configured to fetch the application programming interface associated with each of the plurality of applications 102 (described below in the patent application). Furthermore, the application integrating system 108 is configured to consolidate the application programming interface associated with each of the plurality of applications 102 (as mentioned below in the patent application).

Moreover, the application integrating system 108 is configured to classify each of the application programming interfaces 104a into a corresponding category of applications of the one or more categories of applications. The classification is done based on a first pre-defined criterion (described below in the detailed description of FIG. 2A). In addition, the application integrating system 108 associates the application programming interface associated with each of the plurality of applications 102 based on a second pre-defined criteria (mentioned below in the detailed description of FIG. 2A).

Further, the application integrating system 108 is configured to store a set of information associated with the one or more operations performed by each of one or more components of the application integrating system 108 (described below in the patent application). In an embodiment of the present disclosure, the application integrating system 108 enables unification of the application programming interfaces 104a associated with the corresponding plurality of applications 102. In an embodiment of the present disclosure, the application integrating system 104 enables the application of the plurality of applications 102 to utilize one or more services or features of other one or more application of the plurality of applications 102 at the same time (as described in detail in the detailed description of FIG. 2A).

It may be noted that in FIG. 1, the application of the plurality of applications 102 is associated with the application provider of the plurality of application providers; however those skilled in the art would appreciate that there are more number of applications associated with the application provider of the plurality of application providers. It may be noted that in FIG. 1, the application server of the plurality of application servers 104 is associated with the corresponding application of the plurality of applications 102; however those skilled in the art would appreciate that there are more number of applications associated with a single application server.

Figure 2:
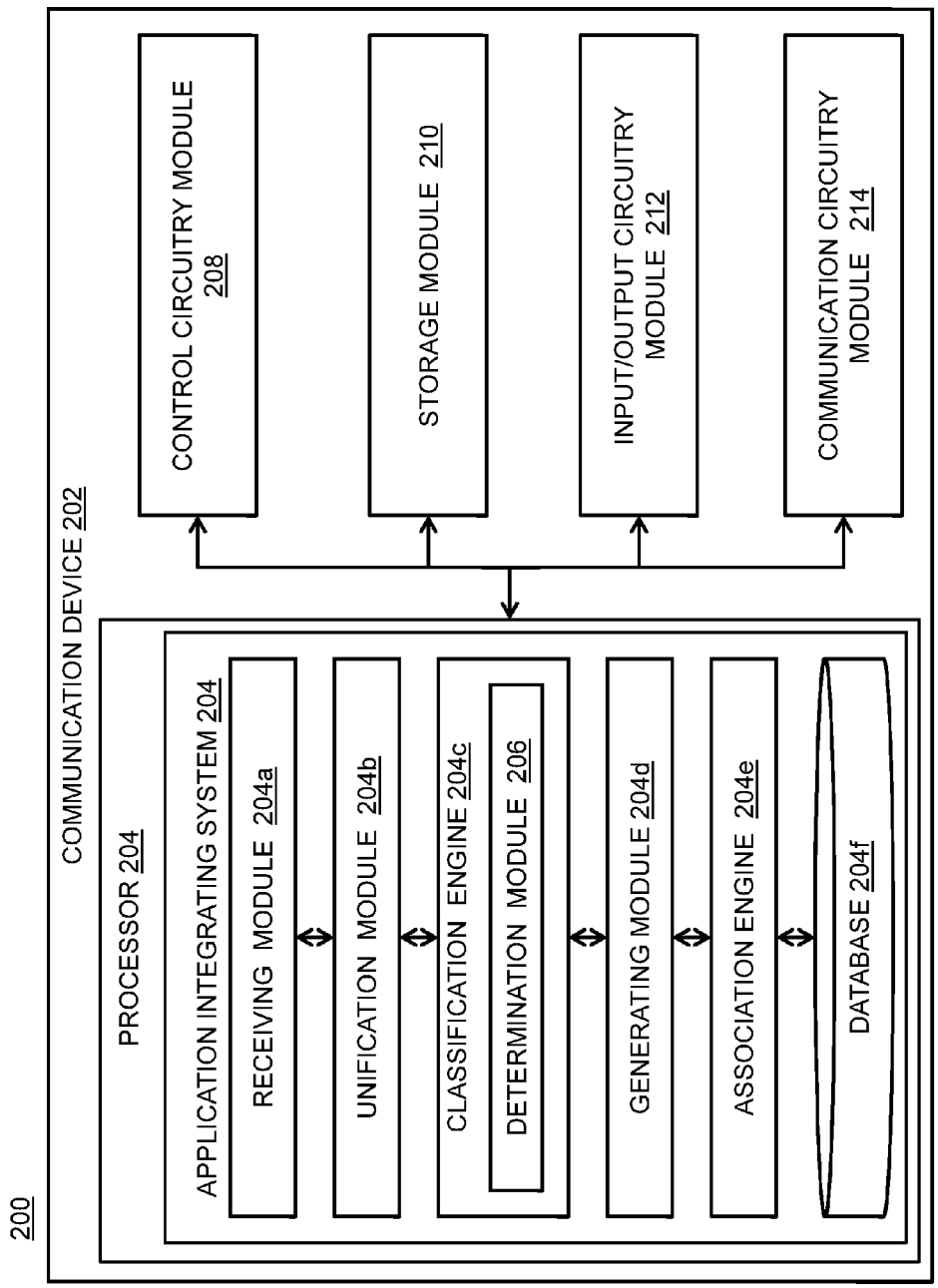
FIG. 2 illustrates a block diagram of a communication device, in accordance with various embodiments of the present disclosure.

FIG. 2 illustrates a block diagram 200 of a communication device 202, in accordance with various embodiments of the present disclosure. The communication device 202 includes a processor 204, a control circuitry module 206, a storage module 208, an input/output circuitry module 210 and a communication circuitry module 212. In an embodiment of the present disclosure, the processor 204 includes one or more components of the application integrating system 108. Further, the one or more components of the application integrating system 108 includes a receiving module 204a, a unification module 204b, a classification module 204c, a determination module 206, a generating module 204d, an association engine 204e and a database 204f. It may be noted that to explain the system elements of FIG. 2, references will be made to the system elements of FIG. 1A.

In an embodiment of the present disclosure, the processor 204 enables the working of the application integrating system 108 for the association of the plurality of applications 102. In an embodiment of the present disclosure, the one or more components of the application integrating system 108 enable the association of the plurality of applications 102. In an embodiment of the present of the disclosure, the communication device 202 enables the hosting of the application integrating system 108.

Going further, each of the plurality of application servers 104 associated with the corresponding plurality of applications 102 is connected to the application integrating system 108 through the communication network 106. In addition, each of the plurality of application servers 104 includes the application programming interface of the application programming interfaces 104a associated with the corresponding application of the plurality of applications 102. Moreover, the receiving module 202 of the application integrating system 108 is configured to fetch the application programming interface associated with each of the plurality of applications 102. In an embodiment of the present disclosure, the application programming interface associated with each of the plurality of applications 102 are fetched in real time.

In an embodiment of the present disclosure, the application programming interface is fetched from the corresponding application server of the plurality of application servers 104. In an embodiment of the present disclosure, the application programming interface associated with each of the plurality of applications 102 are fetched through the communication network 106. In an embodiment of the present disclosure, the application programming interface associated with each of the plurality of applications 102 is stored in a database associated with each of the plurality of application servers 104.

In an embodiment of the present disclosure, each of the plurality of application providers enable the receiving module 204a to fetch their corresponding application interface of the application programming interfaces 104a. In an embodiment of the present disclosure, each of the application programming interfaces 104a are open application programming interfaces for fetching the application programming interface. In an embodiment of the present disclosure, each of the application programming interfaces 104a is fetched from a remote location based on a location of each of the plurality of application servers 104.

For example, an application A1 associated with an application programming interface AP1 is stored on an application server S1, an application A2 associated with an application programming interface AP2 is stored on an application server S2, an application A3 associated with an application programming interface AP3 is stored on an application server S3, an application A4 associated with an application programming interface AP4 is stored on an application server S4, an application A5 associated with an application programming interface AP5 is stored on an application server S5 and an application A6 associated with an application programming interface AP6 is stored on an application server S6. Further, the application A1 and the application A2 is associated with a similar category of application C1 (say, taxi service based application), the application A3 and the application A4 is associated with a similar category of application C2 (say, a food service based application) and the application A5 and the application A6 is associated with a similar category of application C3 (say, a home services based application). The receiving module 204a fetches the application programming interface AP1 from the application server S1, the application programming interface AP2 from the application server S2, the application programming interface AP3 from the application server S3, the application programming interface AP4 from the application server S4, the application programming interface AP5 from the application server S5 and the application programming interface AP6 from the application server S6.

Moreover, the unification engine 204b of the application integrating system 108 unifies the received application programming interface associated with each of the plurality of applications 102. In an embodiment of the present disclosure, the unification module 204b accumulates the application programming interface associated with each of the plurality of applications 102. In an embodiment of the present disclosure, the consolidation is performed for allowing each of the application providers to integrate their application programming interface on the application integrating system 108.

In an embodiment of the present disclosure, each application programming interface of the application programming interfaces 104a is associated with a category of application of the one or more categories of applications. In an embodiment of the present disclosure, the unification module 204b unifies the application programming interfaces associated with each of the plurality of applications 102 at a single place. In an embodiment of the present disclosure, the unification module 204b selectively unifies the application programming interface based on the category of application associated with each application programming interface.

In an embodiment of the present disclosure, the unification module 204b unifies the application programming interface if each of the plurality of applications 102 is the on demand service applications. In an embodiment of the present disclosure, the unification module 204b does not unify if one or more applications of the plurality of applications 102 are not on demand service applications. In an embodiment of the present disclosure, the unification is done at regular intervals of time. In another embodiment of the present disclosure, the consolidation is done as soon as the application programming interface associated with each of the plurality of applications 102 are fetched from each of the plurality of application servers 104.

Going further, the classification engine 204c classifies the application programming interface associated with each of the plurality of applications 102 into the corresponding category of application of the one or more categories of applications. In an embodiment of the present disclosure, the classification engine 204c classifies the application programming interface associated with each of the plurality of applications 102 based on a specific category of application. Moreover, the specific category of application corresponds to a specific category of on demand service applications. In an embodiment of the present disclosure, the classification is performed based on a pre-defined list of categories of applications pre-stored in the application integrating system 108. In an embodiment of the present disclosure, the classification engine 204c matches the category of application against the pre-defined list of categories of applications. Accordingly, the classification engine 204c categorizes the application programming interface based on the matching.

In an embodiment of the present disclosure, information associated with the category of application is fetched along with the application programming interface. In an embodiment of the present disclosure, the application programming interface associated with a same category of application are stored separately from other application programming interface associated with another same category of application. Further, the classification engine 204c includes the determination module 206 configured to determine the corresponding category of application for the application programming interface associated with each of the plurality of applications 102. In an embodiment of the present disclosure, the categorization of the application programming interface is performed after the determination of the category of application associated with each of the plurality of applications 102. In an embodiment of the present disclosure, the category of application is determined by using the pre-defined list of categories of applications stored in the application integrating system 108.

In an embodiment of the present disclosure, the one or more categories of applications are provided by the corresponding plurality of application servers 104. In an embodiment of the present disclosure, the one or more categories of applications are defined by the application provider associated with each of the plurality of applications 102. In another embodiment of the present disclosure, the one or more categories of applications are defined by an administrator associated with the application integrating system 108.

Continuing the above stated example, the unification module 204b consolidates the application programming interface AP1, the application programming interface AP2, the application programming interface AP3, the application programming interface AP4, the application programming interface AP5 and the application programming interface AP6. Moreover, the classification engine 204c categorizes the application programming interface AP1 and the application programming interface AP2 into the category of application C1, categorizes the application programming interface AP3 and the application programming interface AP4 into the category of application C2 (food service based application) and categorizes the application programming interface AP5 and the application programming interface AP6 into the category of application C3 (home services based application).

Going further, the generating module 204d generates a common application programming interface for each of the one or more application programming interfaces categorized into the corresponding distinct category of application. In an embodiment of the present disclosure, the one or more application programming interfaces associated with the similar category of application are unified. Accordingly, a single application programming interface is generated. In an embodiment of the present disclosure, the generation of the common application programming interface enables cross relationship between a first category of application and a second category of application.

Moreover, the association engine 204e associates the application programming interface associated with each of the plurality of applications 102 based on the categorization and a pre-determined set of rules. In addition, the association is done by cross linking the application programming interface associated with each of the plurality of applications 102. In an embodiment of the present disclosure, the association engine 210 enables unification of the one or more application programming interfaces. In an embodiment of the present disclosure, the one or more application programming interfaces associated with a first category of application are cross linked with the one or more application programming interfaces associated with a second category of applications. In another embodiment of the present disclosure, the first category of application is distinct from the second category of application. In an embodiment of the present disclosure, a selective number of the one or more application programming interfaces are cross linked with a selective number of the other one or more application programming interfaces.

In an embodiment of the present disclosure, the one or more application programming interfaces associated with the first category of application are cross linked with the one or more application programming interfaces associated with a plurality of categories of applications. In another embodiment of the present disclosure, the first category of application is distinct from each of the plurality of categories of applications. In yet another embodiment of the present disclosure, each category of application of the plurality of categories of applications is a distinct category of application.

In an embodiment of the present disclosure, the one or more application programming interfaces associated with the first category of application are cross linked with each of the one or more applications associated with the plurality of categories of applications based on the pre-defined set of rules. In another embodiment of the present disclosure, the one or more application programming interfaces associated with the first category of application are cross linked with the one or more application programming interfaces associated with the second category of application and the one or more application programming interfaces associated with a third category of application. In yet another embodiment of the present disclosure, a selective number of the one or more application programming interfaces associated with the first category of application are cross linked with a selective number of the one or more application programming interfaces associated with the second category of applications and a selective number of the one or more application programming interfaces associated with the third category of applications based on the pre-defined set of rules.

Further, the pre-defined set of rules is defined based on a current location of a user accessing the one or more applications of the plurality of applications 102. In addition, the pre-defined set of rules is defined based on current time of accessing the one or more applications of the plurality of applications 102. Moreover, the pre-defined set of rules is defined based on a gender of the user accessing the one or more applications of the plurality of applications 102. Furthermore, the pre-defined set of rules is defined based on an age of the user accessing the one or more applications of the plurality of applications 102. In an embodiment of the present disclosure, the pre-defined set of rules is set by an administrator associated with the application integrating system 108. In another embodiment of the present disclosure, the pre-defined set of rules is set by the application provider associated each of the plurality of applications 108.

In an embodiment of the present disclosure, the location based rule is defined for checking availability of service each of the plurality of applications 102 in a particular area where each of the plurality of applications is accessed. In an embodiment of the present disclosure, the time based rule is defined checking availability of services associated with each of the plurality of applications 102 on a current time of accessing the plurality of applications 102. In an embodiment of the present disclosure, the gender based rules and the age based rule is defined for users belonging to a specific gender and age group who have accessed the plurality of applications 102.

In an embodiment of the present disclosure, the application provider provides the pre-defined set of rules to the administrator of the application integrating system 108. In an embodiment of the present disclosure, the pre-defined set of rules set by both the administrator of the application integrating system 108 and the application provider are taken into account for performing the association. In an embodiment of the present disclosure, the association engine 204e takes a decision for associating the one or more application programming interfaces associated with a particular common category of applications with the one or more application programming interfaces associated with another particular common category of applications in real time.

In an embodiment of the present disclosure, the association is performed for enabling each application provider to utilize services of other application providers through their application programming interfaces in order to enable the plurality of users to access services of various applications on a single application. In an embodiment of the present disclosure, the number of applications currently providing service through the single application is based on the pre-defined set of rules. In an embodiment of the present disclosure, the application integrating system 108 enables each application provider to deal with another application provider through the application programming interfaces 104a.

In an embodiment of the present disclosure, each application provider may deal with a plurality of application providers through the application integrating system 108. In an embodiment of the present disclosure, the application provider may deal with a selected number of application providers based on their choice.

Extending the above stated example, the association engine 204e enables cross linking of the application programming interface AP1 associated with the category of application C1 with the application programming interface AP3 and the application programming interface AP4 associated with the category of application C2. Moreover, the association engine 204e links the application programming interface AP1 associated with the category of application C1 with the application programming interface AP5 and the application programming interface AP6 associated with the category of application C3. In addition, the association engine 204e links the application programming interface AP1 associated with the category of application C1 with the application programming interface AP3 and the application programming interface AP4 associated with the category of application C2 and with the application programming interface AP5 and the application programming interface AP6 associated with the category of application C3. Further, the association engine 204e links the application programming interface AP1 associated with the category of application C1 with the application programming interface AP3 associated with the category of application C2 and the application programming interface AP5 associated with the category of application C3 only based on the pre-defined set of rules.

Going further, the database 204f stores the application programming interface associated with each of the plurality of applications 102 and each of the classified application programming interfaces. In addition, the database 204f stores each of the unified application programming interfaces and each of the associated application programming interfaces and the pre-determined set of rules.

It may be noted that in FIG. 2, various modules of the application integrating system 108 are shown that illustrates the working of the application integrating system 108; however those skilled in the art would appreciate that the application integrating system 108 may have more number of modules that could illustrate overall functioning of the application integrating system 108.

Going further, the communication device 202 includes any suitable type of portable electronic device. Examples of the communication device 202 include but may not be limited to a personal e-mail device (e.g., a Blackberry™ made available by Research in Motion of Waterloo, Ontario), a personal data assistant ("PDA"), a cellular telephone, a Smartphone, the laptop computer, and the tablet computer. In another embodiment of the present disclosure, the communication device 202 can be a desktop computer.

From the perspective of this disclosure, the control circuitry module 208 includes any processing circuitry or processor operative to control the operations and performance of the communication device 202. For example, the control circuitry module 208 may be used to run operating system applications, firmware applications, media playback applications, media editing applications, or any other application. In an embodiment, the control circuitry module 208 drives a display and process inputs received from the user interface. From the perspective of this disclosure, the storage module 210 includes one or more storage mediums including a hard-drive, solid state drive, flash memory, permanent memory such as ROM, any other suitable type of storage component, or any combination thereof. The storage module 210 may store, for example, media data (e.g., music and video files), application data (e.g., for implementing functions on the communication device 202).

From the perspective of this disclosure, the I/O circuitry module 212 may be operative to convert (and encode/decode, if necessary) analog signals and other signals into digital data. In an embodiment, the I/O circuitry module 210 may also convert the digital data into any other type of signal and vice-versa. For example, the I/O circuitry module 212 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 208, the storage module 210 or any other component of the communication device 202. It may be noted that the I/O circuitry module 212 is illustrated in FIG. 2 as a single component of the communication device 202; however those skilled in the art would appreciate that several instances of the I/O circuitry module 212 may be included in the communication device 202.

The communication device 202 may include any suitable interface or component for allowing the users to provide inputs to the I/O circuitry module 212. The communication device 202 may include any suitable input mechanism. Examples of the input mechanism include but may not be limited to a button, keypad, dial, a click wheel, and a touch screen. In an embodiment, the communication device 202 may include a capacitive sensing mechanism, or a multi-touch capacitive sensing mechanism. In an embodiment, the communication device 202 may include specialized output circuitry associated with output devices such as, for example, one or more audio outputs. The audio output may include one or more speakers built into the communication device 202, or an audio component that may be remotely coupled to the communication device 202.

The one or more speakers can be mono speakers, stereo speakers, or a combination of both. The audio component can be a headset, headphones or ear buds that may be coupled to the communication device 202 with a wire or wirelessly. In an embodiment, the I/O circuitry module 212 may include display circuitry for providing a display visible to the users. For example, the display circuitry may include a screen (e.g., an LCD screen) that is incorporated in the communication device 202. The display circuitry may include a movable display or a projecting system for providing a display of content on a surface remote from the communication device 202 (e.g., a video projector). In an embodiment, the display circuitry may include a coder/decoder to convert digital media data into the analog signals. For example, the display circuitry may include video Codecs, audio Codecs, or any other suitable type of Codec.

The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 208. Alternatively, the display circuitry may be operative to provide instructions to a remote display. In addition, the communication device 202 includes the communication circuitry module 214. The communication circuitry module 214 may include any suitable communication circuitry operative to connect to a communication network and to transmit communications (e.g., voice or data) from the communication device 202 to other devices within the communications network. The communication circuitry module 214 may be operative to interface with the communication network using any suitable communication protocol. Examples of the communication protocol include but may not be limited to Wi-Fi, Bluetooth RTM, radio frequency systems, infrared, LTE, GSM, GSM plus EDGE, CDMA, and quadband.

In an embodiment, the communication circuitry module 214 may be operative to create a communications network using any suitable communications protocol. For example, the communication circuitry module 214 may create a short-range communication network using a short-range communications protocol to connect to other devices. For example, the communication circuitry module 214 may be operative to create a local communication network using the Bluetooth, RTM protocol to couple the communication device 202 with a Bluetooth, RTM headset.

It may be noted that the computing device is shown to have only one communication operation; however, those skilled in the art would appreciate that the communication device 202 may include one more instances of the communication circuitry module 214 for simultaneously performing several communication operations using different communication networks. For example, the communication device 202 may include a first instance of the communication circuitry module 214 for communicating over a cellular network, and a second instance of the communication circuitry module 214 for communicating over Wi-Fi or using Bluetooth RTM.

In an embodiment of the present disclosure, the same instance of the communication circuitry module 214 may be operative to provide for communications over several communication networks. In an embodiment, the communication device 202 may be coupled to a host device for data transfers, syncing the communication device 202, software or firmware updates, providing performance information to a remote source (e.g., providing riding characteristics to a remote server) or performing any other suitable operation that may require the communication device 202 to be coupled to the host device. Several computing devices may be coupled to a single host device using the host device as a server. Alternatively or additionally, the communication device 202 may be coupled to the several host devices (e.g., for each of the plurality of the host devices to serve as a backup for data stored in the communication device 202).

Figure 3A:
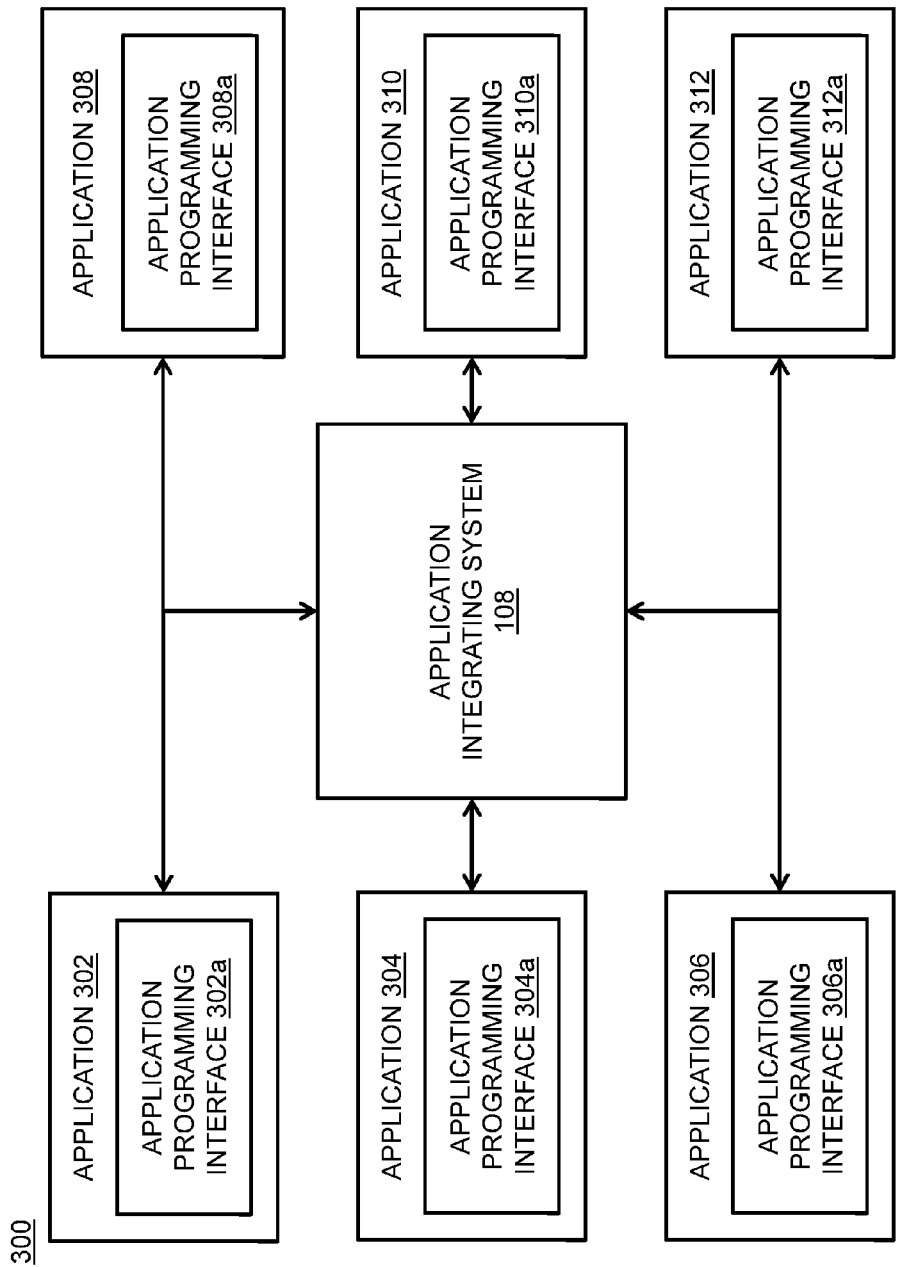
FIG. 3A and FIG. 3B illustrate a block diagram for showing an example of association of the plurality of applications, in accordance with various embodiments of the present disclosure.

FIG. 3A illustrates a block diagram 300 for showing an example of the cross linking of the one or more applications associated with the corresponding category of the one or more categories of applications, in accordance with various embodiments of the present disclosure. It may be noted that to explain the system elements of FIG. 3A, references will be made to the system elements of FIG. 1 and FIG. 2. The block diagram 200 includes an application 302, an application 304, an application 306, an application 308, an application 310, an application 312 and an application integrating system 108. In addition, the block diagram 300 shows the cross linking between two different categories of applications.

Further, the application 302 is associated with an application programming interface 302a, the application 304 is associated with an application programming interface 304a, the application 306 is associated with an application programming interface 306a, the application 308 is associated with an application programming interface 308a, the application 310 is associated with an application programming interface 310a and the application 312 is associated with an application programming interface 312a. Moreover, in an embodiment of the present disclosure, the application programming interface 302a, the application programming interface 304a and the application programming interface 306a are associated with the first category of application.

Further, in an embodiment of the present disclosure, the application programming interface 308a, the application programming interface 310a and the application programming interface 312a are associated with the second category of application. The application integrating system 108 fetches the application programming interface 302a, the application programming interface 304a, the application programming interface 306a, the application programming interface 308a, the application programming interface 310a and the application programming interface 312a. In addition, the application programming interface 108 consolidates the application programming interface 302a, the application programming interface 304a, the application programming interface 306a, the application programming interface 308a, the application programming interface 310a and the application programming interface 312a.

Moreover, the application integrating system 108 categorizes the application programming interface 302a, the application programming interface 304a and the application programming interface 306a into the first category of application and categorizes the application programming interface 308a, the application programming interface 310a and the application programming interface 312a into the second category of application. Further, the application integrating system 108 links the application programming interface 302a, the application programming interface 304a and the application programming interface 306a associated with the first category of application with the application programming interface 308a, the application programming interface 310a and the application programming interface 312a.

In an embodiment of the present disclosure, the application integrating system 108 links the application programming interface 302a with the application programming interface 308a, the application programming interface 310a and the application programming interface 312 based on the pre-defined set of rules. In another embodiment of the present disclosure, the application integrating system 108 links the application programming interface 302a with the application programming interface 308a and the application programming interface 310a based on the pre-defined set of rules. In yet another embodiment of the present disclosure, the application integrating system 108 links the application programming interface 302a with the application programming interface 308a and the application programming interface 312a based on the pre-defined set of rules.

In yet another embodiment of the present disclosure, the application integrating system 108 links the application programming interface 302a with the application programming interface 310a and the application programming interface 312a based on the pre-defined set of rules.

Figure 3B:
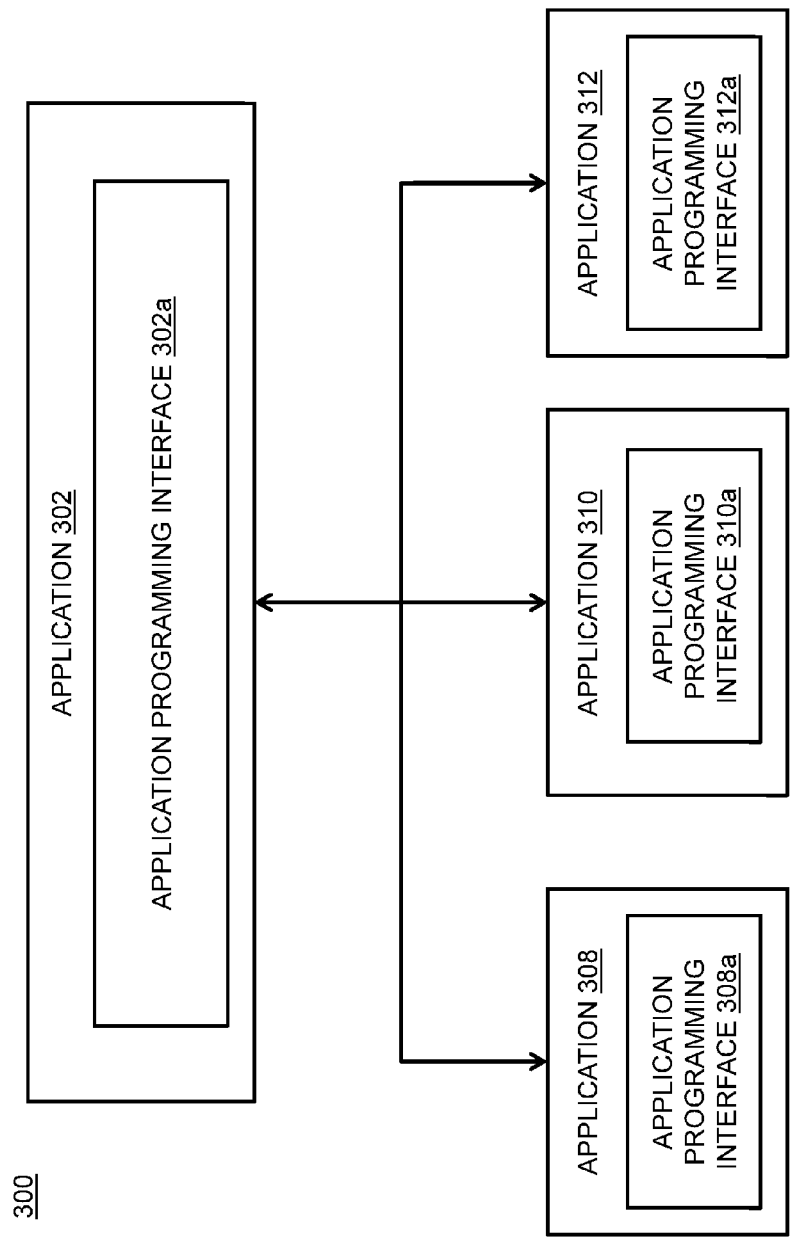

FIG. 3B illustrates a block diagram 200 for showing cross linking of the plurality of applications, in accordance with various embodiments of the present disclosure. It may be noted that to explain the system elements of FIG. 3B, references will be made to the system elements of FIG. 1, FIG. 2 and FIG. 3A. In addition, the block diagram 200 shows the cross linking of a single application (the application 302) associated with the first category of application with the one or more applications (the application 308, the application 310 and the application 312) associated with the second category of applications.

Going further, the application integrating system 108 links the application programming interface 302a associated with the application 302 with the application programming interface 308a associated with the application 308, the application programming interface 310a associated with the application 310 and the application programming interface 312a associated with the application 312. In an embodiment of the present disclosure, the application integrating system 108 enables the application provider associated with the application 302 to utilize services and functions of the application 308, the application 310 and the application 312 through the corresponding application programming interface 308a, the corresponding application programming interface 310a and the corresponding application programming interface 312a.

In an embodiment of the present disclosure, the application integrating system 108 may link the application programming interface 302a with a selective number of application programming interfaces of the application programming interface 308a, the application programming interface 310a and the application programming interface 312a based on the pre-defined set of rules. In an embodiment of the present disclosure, the application provider associated with the application 302 may or may not display service from each of the applications 308-312 based on a choice of the application provider. For example, a user A accesses an application X integrated with an application Y through an application programming interface Y1 and an application Z through an application programming interface Z1. The application integrating system 108 checks the current location of the user A and finds that the services of the application Y are not available in the current location. The application integrating system 108 displays or enables services of the application Z only on the application X based on the current location.

In another example, the application integrating system 108 checks the current time (say, 9.30 pm) at which the user A accesses the application X and determines that the application Z does not provide service at the current time. The application integrating system 108 displays or enables services of the application Y only on the application X based on the current time.

Figure 3C:
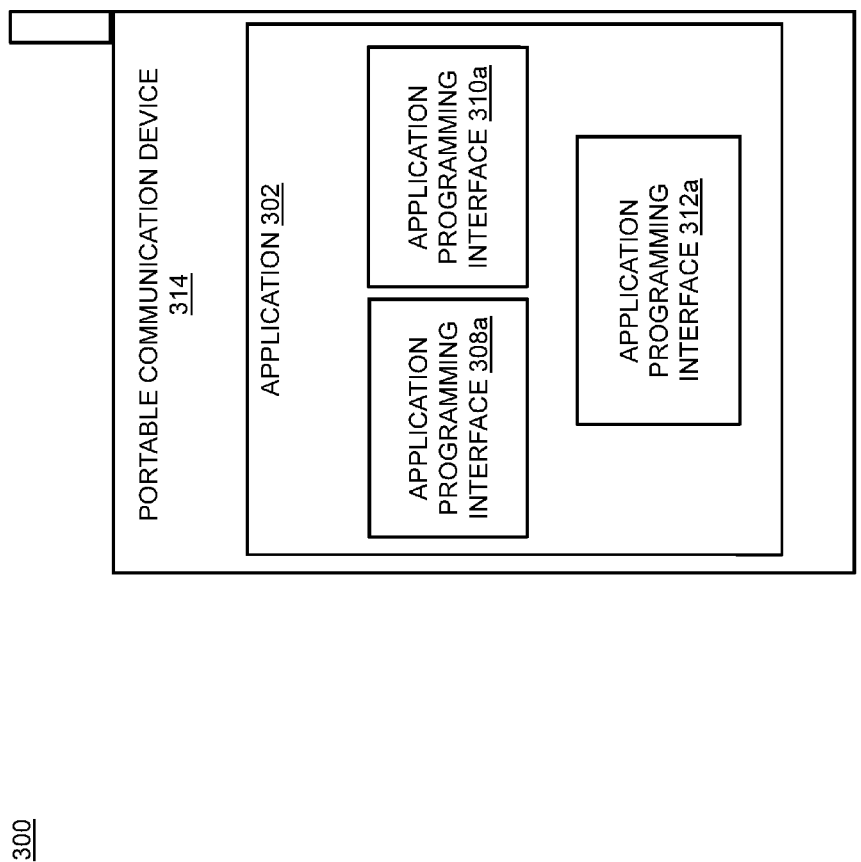
FIG. 3C illustrates a portable communication device for showing the association of the plurality of applications, in accordance with various embodiments of the present disclosure.

FIG. 3C illustrates a portable communication device 314 for showing the cross linking of the plurality of applications, in accordance with various embodiments of the present disclosure. It may be noted that to explain the system elements of FIG. 3C, references will be made to the system elements of FIG. 1, FIG. 2, FIG. 3A and FIG. 3B. The portable communication device 314 includes the application 302 installed on the portable communication device 314. In addition, the portable communication device 314 includes a smart phone, a tablet, a laptop and the like. In an embodiment of the present disclosure, the portable communication device 314 is associated with a specific type of operating system.

Going further, the application programming interface 302a associated with the application 302 is linked with the application programming interface 308a, the application programming interface 310a and the application programming interface 312a. In addition, the application 302 is accessed by the user of a plurality of users presently in any location and on a specified time for requesting any service. The application integrating system 108 checks the current location and the current time of the access of the application 302 and determines that the services of each the application 308, the application 310 and the application 312 is available in the present location and the present time.

The application integrating system 108 displays the services of each of the application 308, the application 310 and the application 312 on the application 302 on a screen of the portable communication device 314. The user may choose services from any application based on his/her choice.

Figure 4:
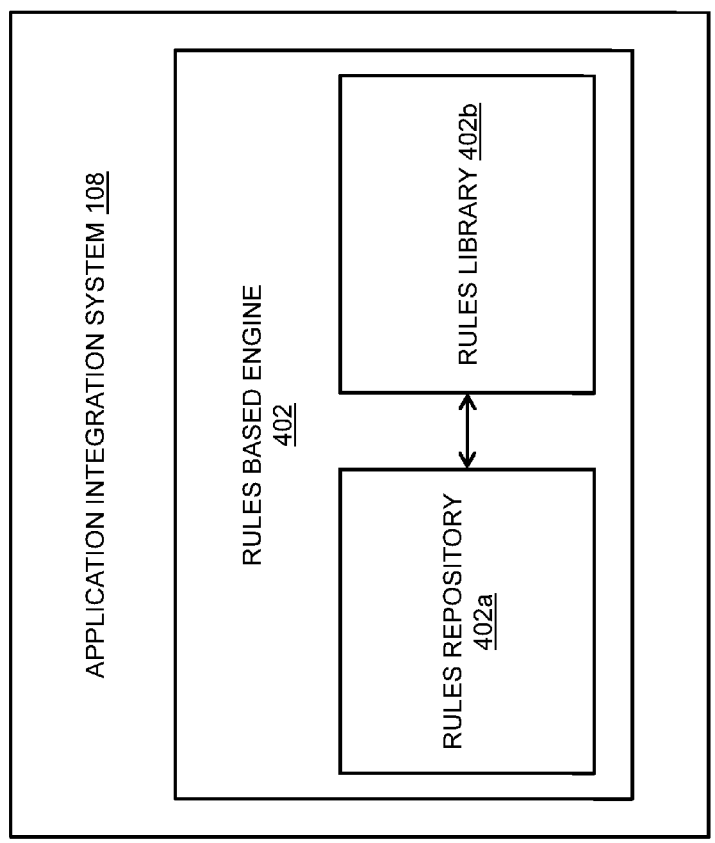
FIG. 4 illustrates an additional component of an application integrating system, in accordance with various embodiments of the present disclosure.

FIG. 4 illustrates a block diagram 400 for showing an additional component of the application integrating system 108, in accordance with various embodiments of the present disclosure. The additional component of the application integrating system 108 includes a rules based engine 402. In addition, the rules based engine 402 is configured to define the pre-defined set of rules for enabling the cross linking of the plurality of applications 102.

In an embodiment of the present disclosure, the administrator associated with the application integrating system 108 sets the pre-defined set of rules though the rules based engine 402. In an embodiment of the present disclosure, the pre-defined set of rules is updated through the rules based engine 402. In an embodiment of the present disclosure, the pre-defined set of rules is stored in the rules based engine 402. In addition, the rules based engine 402 includes a rules repository 402a and a rules library 402b. Moreover, the rules repository 402a stores the pre-defined set of rules and the rules library 402b is used for setting the pre-defined set of rules.

FIG. 5 illustrates a flowchart 500 for the association of the plurality of applications 102, in accordance with various embodiments of the present disclosure. It may be noted that to explain the process steps of the flowchart 500, references will be made to the system elements of the FIG. 1 and FIG. 2. The flowchart 500 initiates at step 502. At step 504, the receiving module 204a receives the application programming interface associated with each of the plurality of applications 102. At step 506, the unification module 204b unifies the received application programming interface associated with each of the plurality of applications 102. At step 508, the classification engine 204c classifies the application programming interface associated with each of the plurality of applications 102 into the corresponding category of application of the one or more categories of applications. At step 510, the association engine 204e associates the application programming interface associated with each of the plurality of applications 102 based on the classification and the pre-determined set of rules. Furthermore, the association is done by cross linking the application programming interface associated with each of the plurality of applications 102. The flowchart 500 terminates at step 512.

It may be noted that the flowchart 500 is explained to have above stated process steps; however, those skilled in the art would appreciate that the flowchart 300 may have more/less number of process steps which may enable all the above stated embodiments of the present disclosure.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer implemented method for associating a plurality of applications, the computer-implemented method comprising:
   receiving, with a processor, an application programming interface associated with each of the plurality of applications;
   unifying, with the processor, the received application programming interface associated with each of the plurality of applications;
   classifying, with the processor, the application programming interface associated with each of the plurality of applications into a corresponding category of application of one or more categories of applications associated with the corresponding plurality of applications; and
   associating, with the processor, the application programming interface associated with each of the plurality of applications based on the classification and a pre-determined set of rules, wherein the associating being done by cross linking the application programming interface associated with each of the plurality of applications.

2. The computer-implemented method as recited in claim 1, further comprising determining, with the processor, the corresponding category of application for the application programming interface associated with each of the plurality of applications and wherein each of the plurality of applications being an on demand service application.

3. The computer-implemented method as recited in claim 1, wherein one or more application programming interfaces associated with a first category of application being cross linked with one or more application programming interfaces associated with a second category of applications, wherein the first category of application being distinct from the second category class of application.

4. The computer-implemented method as recited in claim 3, wherein the one or more application programming interfaces associated with the first category of application being cross linked with one or more application programming interfaces associated with a plurality of categories of applications, wherein the first category of application being distinct from each of the plurality of categories of applications and wherein each category of application of the plurality of categories of application being a distinct category of application.

5. The computer-implemented method as recited in claim 1, wherein the pre-determined set of rules being defined based on a current location of a user accessing one or more applications of the plurality of applications, a current time of accessing the one or more applications of the plurality of applications, a gender of the user accessing the one or more applications of the plurality of applications and an age of the user accessing the one or more applications of the plurality of applications.

6. The computer-implemented method as recited in claim 5, wherein the pre-determined set of rules being set by an administrator.

7. The computer-implemented method as recited in claim 6, wherein the pre-determined set of rules being set by an application provider associated with each of the plurality of applications.

8. The computer-implemented method as recited in claim 1, wherein the application programming interface associated with each of the plurality of applications being received from a corresponding application server of a plurality of application servers associated with the corresponding plurality of applications.

9. The computer-implemented method as recited in claim 1, further comprising generating, with the processor, a common application programming interface for each of one or more application programming interfaces classified into a corresponding similar category of application.

10. The computer-implemented method as recited in claim 1, further comprising storing, with the processor, the application programming interface associated with each of the plurality of applications, each of the classified application programming interface, each of the unified application programming interfaces, each of the associated application programming interfaces and the pre-determined set of rules.

11. A system for associating a plurality of applications, the system comprising:
 a receiving module in a processor, the receiving module being configured to receive an application programming interface associated with each of the plurality of applications;
 a unification module in the processor, the unification module being configured to unify the received application programming interface associated with each of the plurality of applications;
 a classification engine in the processor, the classification engine being configured to classify the application programming interface associated with each of the plurality of applications into a corresponding category of application of one or more categories of applications associated with the corresponding plurality of applications; and
 an association engine in the processor, the association engine being configured to associate the application programming interface associated with each of the plurality of applications based on the classification and a pre-determined set of rules, wherein the associating being done by cross linking the application programming interface associated with each of the plurality of applications.

12. The system as recited in claim 11, wherein the classification engine further comprises a determination module in the processor, the determination module being configured to determine the corresponding category of application for the application programming interface associated with each of the plurality of applications and wherein each of the plurality of applications being an on demand service application.

13. The system as recited in claim 11, wherein one or more application programming interfaces associated with a first category of application being cross linked with one or more application programming interfaces associated with a second category of applications, wherein the first category of application being distinct from the second category of application.

14. The system as recited in claim 13, wherein the one or more application programming interfaces associated with the first category of application being cross linked with one or more application programming interfaces associated with a plurality of categories of applications, wherein the first category of application being distinct from each of the plurality of categories of applications and wherein each category of application of the plurality of categories of application being a distinct category of application.

15. The system as recited in claim 11, further comprising a generating Module in the processor, the generating module being configured to generate a common application programming interface for each of one or more application programming interfaces classified into a corresponding similar category of application.

16. The system as recited in claim 11, further comprising a database in the processor, the database being configured for storing the application programming interface associated with each of the plurality of applications, each of the classified application programming interface, each of the unified application programming interfaces, each of the associated application programming interfaces and the pre-determined set of rules.

\* \* \* \* \*